Nov. 15, 1932.  G. PIELSTICK  1,887,661
INTERNAL COMBUSTION ENGINE
Filed Oct. 30, 1930

A-A

Inventor
Gustav Pielstick
By Maréchal & Noe
attys.

Patented Nov. 15, 1932

1,887,661

UNITED STATES PATENT OFFICE

GUSTAV PIELSTICK, OF AUGSBURG, GERMANY, ASSIGNOR TO MASCHINENFABRIK AUGSBURG-NÜRNBERG A. G., OF AUGSBURG, GERMANY, A CORPORATION OF GERMANY

INTERNAL COMBUSTION ENGINE

Application filed October 30, 1930, Serial No. 492,156, and in Germany November 29, 1929.

This invention relates to internal combustion engines.

One object of the invention is the provision of an internal combustion engine having a rotatable exhaust valve in the exhaust passage, the valve comprising a stem member which is offset from an axial position to provide a clear and unobstructed passage for a flow of exhaust gases, when the valve is open.

Another object of the invention is the provision of a two-stroke cycle engine having piston controlled inlet and exhaust ports, and a rotatable valve in the exhaust passage operating in timed relation with the piston so as to close the exhaust passage substantially at the time the piston closes the inlet ports.

Another object of the invention is the provision in a two-stroke cycle engine having piston controlled exhaust ports, of a series of connected similarly constructed rotary valve units each providing a clear and unobstructed path for the exhaust flow when open.

Other objects and advantages of the invention will be apparent from the following description, the appended claims and the accompanying drawing, in which—

Figure 1:
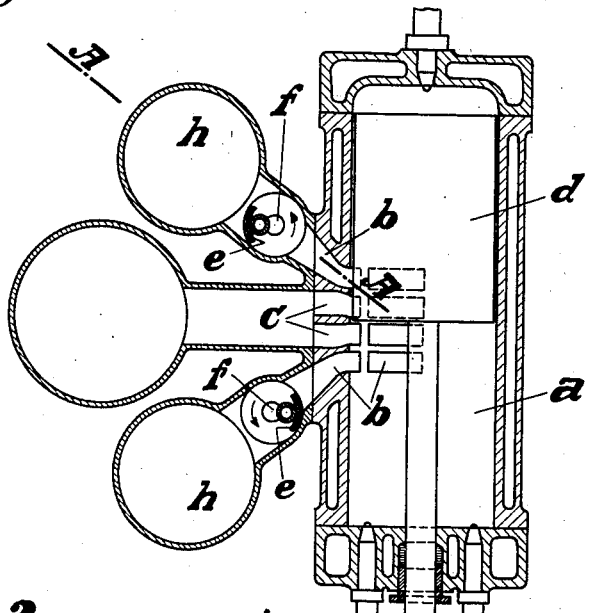
Figure 2:
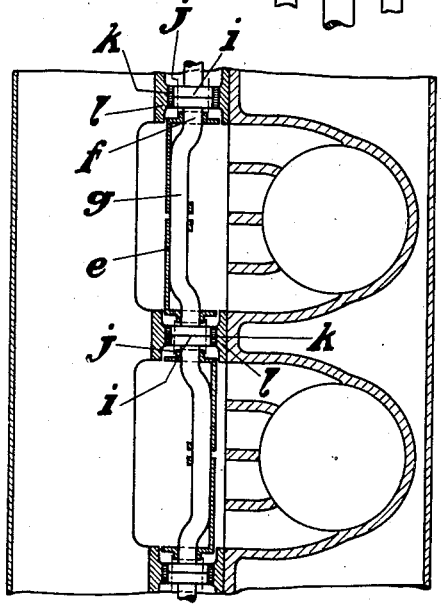

Fig. 1 is a longitudinal section through a cylinder of an engine embodying the present invention; and Fig. 2 is a transverse section through the cylinder on the line $a$—$a$ of Fig. 1.

This invention, as shown in the drawing, is preferably employed in connection with a two-stroke cycle engine adapted to operate upon an explosive mixture, or upon the Diesel principle. The engine may have any desired number of cylinders, arranged in series, two of these cylinders being shown in Fig. 2. Each cylinder is shown as of the double acting type and embodies the cylinder walls $a$, having exhaust slots $b$ and scavenging slots $c$ arranged in adjacent superposed planes so that a flow of scavenging air may take place across the cylinder and along the cylinder wall, reversing its direction of travel at the end of the cylinder and returning along the cylinder wall to the exhaust ports. Both the inlet and the exhaust ports are controlled by the piston $d$, which, on its downward stroke, as viewed in Fig. 1, will first open the exhaust slots $b$, (referring to the upper cylinder), and then as the piston continues to move downwardly it will uncover the scavenging slots $c$. Opposite ends of the double acting engine are of course constructed similarly. On the compression stroke the scavenging slots $c$ are closed before the exhaust slots are closed, and in order to prevent escape of scavenging air through open exhaust slots after the scavenging slots have been closed by the piston, a rotary valve $e$ is provided in the exhaust passage leading from the ports.

The valve $e$ is operated in timed relation with the piston movements, preferably being connected to the crank shaft of the engine so as to operate in the direction of the arrows at the same speed as the engine. The valve $e$ is so arranged that it will close the passage $h$ leading from the exhaust ports at the time the scavenging air inlet ports are closed by the piston, so as to prevent the escape of scavenging air.

The axis of the valve $e$ is arranged transversely to the longitudinal axis of the cylinder. To provide for the flow of a cooling liquid, the valve closure plate is supported on a hollow or tubular member $g$ which must be made of a substantial size to provide for an adequate flow of the cooling medium. A comparatively large diameter of the tubular valve stem is quite disadvantageous inasmuch as a free flow of exhaust gases would tend to be prevented, but in accordance with the present invention a clear and substantially unobstructed path is provided for the exhaust gases by offsetting the valve stem $g$ from an axial position to a position at one side of the exhaust passage and close to the closure plate of the valve. Thus, when the valve is open, a substantially unobstructed flow of exhaust gases may take place. After leaving the exhaust slots the gases will not rebound and be dammed up against the valve stem as the valve stem, being offset, does not divide the flow of exhaust gases as it would if it extended axially through the valve passage. The result is that the back pressure on the exhaust flow is so reduced that in high speed engines a complete scavenging of the cylinders is satisfactorily obtained in the required time.

For multi-cylinder engines the valve stem is made of assembled units which are arranged in an aligned series alongside of the cylinders to simplify the assembly of the valve shafts. The valves may all be of similar form and construction, each comprising an offset valve stem terminating at opposite ends in flanges *i* by means of which they are connected together as by screws provided at the points *j*. The flanges also preferably form the bearing members for the stem, being rotatably supported in bearings *k* of the valve housing *l*. The various valve units are assembled at the proper angular displacement with respect to one another coordinated with the piston timing of the several cylinders. The bearings *k* are preferably arranged between adjacent cylinders so that the offset portions of the valve stem lie opposite the exhaust ports.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An internal combustion engine comprising a cylinder having an exhaust port, a piston in said cylinder adapted to open and close said port, and a valve for controlling the escape of exhaust gases after they pass through said exhaust port, said valve comprising an arcuate closure member and hollow supporting means therefor rotatably mounted and offset from the axis of rotation and in contact with said closure member adjacent the exhaust port location to provide a clear and substantially straight path for the exhaust flow when the valve is open.

2. In an internal combustion engine, an exhaust valve comprising a thin arcuate closure member, and a hollow stem rotatably supporting said closure member, said stem being offset from the axis of rotation and towards said closure member and in contact therewith to provide a clear and substantially straight path when the valve is open.

3. A two-stroke cycle engine comprising a cylinder having an exhaust port, a piston in said cylinder adapted to open and close said port, and a valve controlling the escape of the exhaust gases after they pass through said exhaust port, said valve comprising an arcuate closure plate and a hollow supporting stem fixed to and rotatably supporting said closure plate, said stem being offset adjacent the exhaust port location from a central axial position to provide a clear path for the exhaust flow when the valve is open.

4. A two-stroke cycle engine comprising a cylinder having a port, a piston in said cylinder adapted to open and close said port, and a rotary valve for controlling the flow of gases passing through said port, said valve comprising an arcuately curved closure plate and a rotatably mounted hollow supporting stem offset from an axial position adjacent the port location so that it is close to said closure plate to provide a clear and substantially straight path for the flow of gases when the valve is open.

5. A two-stroke cycle engine comprising a cylinder having an exhaust port, a piston in said cylinder adapted to open and close said port, a piston controlled inlet port in said cylinder, and a valve for controlling the escape of exhaust gases after they pass through said exhaust port, said valve comprising hollow supporting means rotatably mounted and offset from its axis of rotation adjacent the exhaust port location to provide a clear and substantially straight path for the exhaust flow when the valve is open, and means for operating said valve in timed relation with the piston operation to close the valve substantially at the time the piston closes said inlet port.

6. An internal combustion engine comprising a series of cylinders having piston controlled exhaust ports, and valves in the exhaust passages for controlling the escape of exhaust gases, said valves comprising connected rotatable units each having a hollow stem offset from an axial line adjacent the exhaust port location to provide a clear and substantially straight path for the exhaust flow when the valve is open.

7. An internal combustion engine comprising a series of cylinders having piston controlled exhaust ports, and valves in the exhaust passages for controlling the escape of exhaust gases, said valves comprising connected rotatable units each having a hollow stem offset from an axial line adjacent the exhaust port location to provide a clear path for the exhaust flow when the valve is open, each unit terminating in a flange, the adjacent flanges being connected at points between cylinder locations.

8. An internal combustion engine comprising a series of cylinders having piston controlled exhaust ports, and valves in the exhaust passages for controlling the escape of exhaust gases, said valves comprising connected rotatable units each having a hollow stem offset from an axial line adjacent the exhaust port location to provide a clear path for the exhaust flow when the valve is open, each unit terminating in a flange, the adjacent flanges being connected at points between cylinder locations, and means for rotatably mounting said connected flanges.

9. An internal combustion engine comprising a series of cylinders each having a piston controlled exhaust port and an exhaust passage, and a rotary valve in each exhaust passage for controlling the escape of exhaust gases after they have passed through the exhaust ports, said valves comprising similar units arranged in line and connected at their ends one with another at angular displacements coordinated with the timing of the pistons, each valve comprising a closure member and an offset hollow supporting stem offset toward the closure member from an axial position to provide a clear path for the exhaust flow when the valve is open.

In testimony whereof I affix my signature.

GUSTAV PIELSTICK.